(12) United States Patent
Wildhagen

(10) Patent No.: US 7,292,694 B2
(45) Date of Patent: Nov. 6, 2007

(54) NOISE REDUCTION IN A STEREO RECEIVER

(75) Inventor: Jens Wildhagen, Weinstadt (DE)

(73) Assignee: Sony Deutschland GmbH, Cologne (DE)

(*) Notice: Subject to any disclaimer, the term of this patent is extended or adjusted under 35 U.S.C. 154(b) by 1147 days.

(21) Appl. No.: 10/225,854

(22) Filed: Aug. 22, 2002

(65) Prior Publication Data
US 2003/0039363 A1   Feb. 27, 2003

(30) Foreign Application Priority Data
Aug. 24, 2001   (EP) ................... 01120328

(51) Int. Cl.
*H04H 5/00*   (2006.01)
(52) U.S. Cl. ......................... 381/13; 381/11
(58) Field of Classification Search ............ 381/13, 381/94.1, 94.3, 11
See application file for complete search history.

(56) References Cited

U.S. PATENT DOCUMENTS
5,253,299 A   10/1993   Ishida et al.

FOREIGN PATENT DOCUMENTS

| DE | 44 00 865 | 7/1995 |
|----|-----------|--------|
| EP | 0 955 732 | 11/1999 |
| EP | 1 206 043 | 5/2002 |

OTHER PUBLICATIONS

Patent Abstracts of Japan, vol. 018, No. 593, Nov. 11, 1994. JP 06 224866.

*Primary Examiner*—Stella Woo
(74) *Attorney, Agent, or Firm*—Oblon, Spivak, McClelland, Maier & Neustadt, P.C.

(57) ABSTRACT

A method to denoise a stereo signal which comprises a stereo sum signal ($U_s(z)$) and a stereo difference signal ($U_d(z)$), wherein a stereo to mono blending on basis of an attenuation of the stereo difference signal ($U_d(z)$) is performed, determines an attenuation of the stereo difference signal ($U_d(z)$) under consideration of the difference signal amplitude. Therefore, a stereo signal noise reducer which performs a stereo to mono blending on basis of an attenuation of the stereo difference signal, comprises an attenuation factor determination unit which determines an attenuation factor ($H_{att}$) under consideration of the difference signal amplitude.

22 Claims, 2 Drawing Sheets

NOISE REDUCTION IN A STEREO RECEIVER

DESCRIPTION

The present invention relates to a method to denoise a stereo signal and to a stereo signal noise reducer working according to said method.

FM broadcasting is currently the most important broadcast system in the world. Analogue broadcast receivers have been developed for a long time with the result of highest performance receivers. New technology offers the possibility to use new algorithms for the reception of FM broadcast signals. In particular, the increasing processing power and decreasing costs of digital processors (DSPs) offer possibilities to process analogue broadcast systems like FM and AM digitally. The digital signal processing of analogue systems offers many advantages. The receiver size can be decreased by integration of functionality into one IC and digital broadcast systems like DRM or DAB can be integrated into the same LSI.

Figure 2:
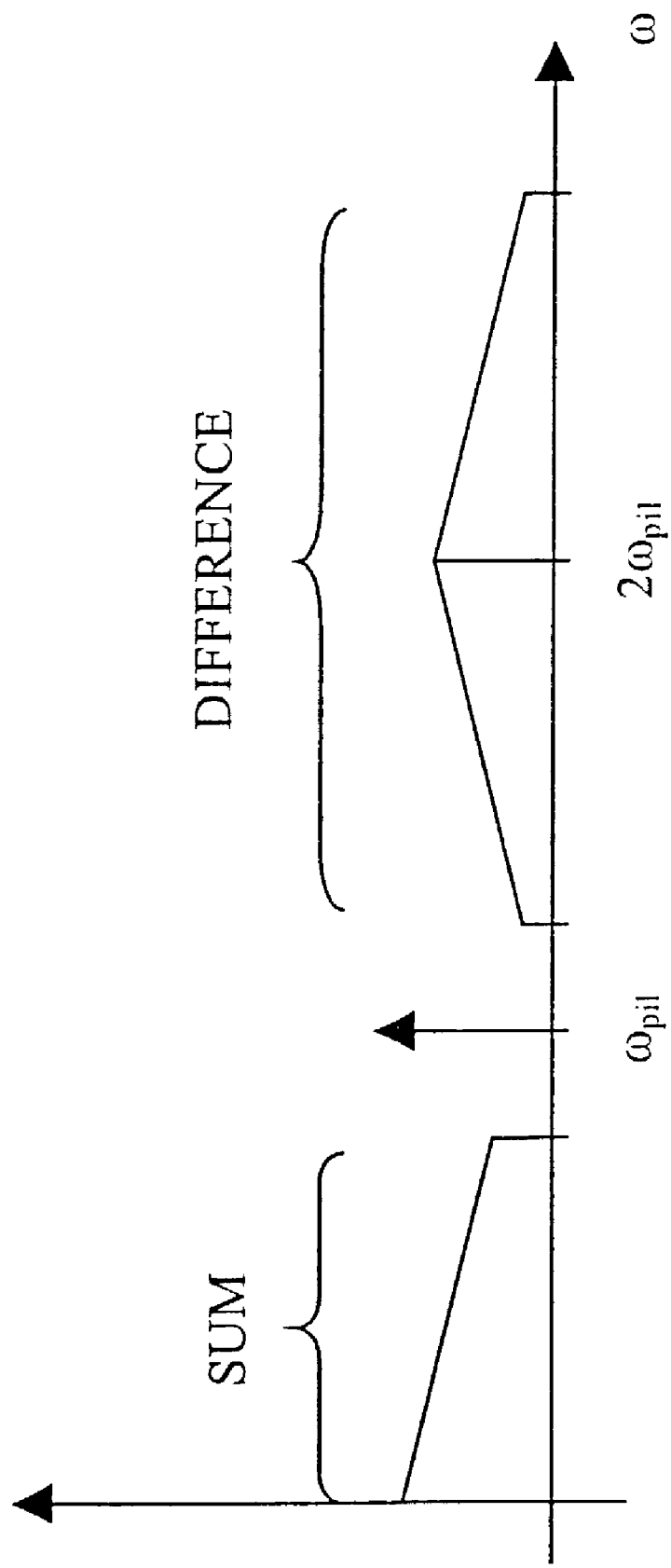

In FM broadcasting a multiplex signal is frequency modulated. FIG. 2 shows the spectrum of a multiplex signal. The multiplex signal consists of a sum signal and an amplitude modulated difference signal with suppressed carrier. The sum signal contains the information of the left+right audio signal and the difference signal contains the information of the left-right audio signal. To allow a demodulation of the amplitude modulated difference signal a pilot carrier is added to the multiplex signal.

In mobile FM receivers the reception situation is often bad. Current FM receivers switch from stereo reception to mono reception to gain a signal to noise ratio (SNR) of about 20.7 dB based on the fieldstrength and multipath detection. Such a denoising is based on the fact that the frequency demodulator output noise power spectral density is increasing squared to the frequency, i.e. that the mono signal which is equal to the stereo sum signal contains less noise than the stereo difference signal which is transmitted in a higher frequency range of the frequency demodulated multiplex signal.

Since the switching from stereo to mono is mostly clearly audible, most FM receivers for mobile reception use a sliding stereo to mono transition. Such a sliding stereo to mono blending is disclosed in DE 44 00 865 C2 according to which the stereo channel separation might be continuously reduced dependent on information about the program type as well as a noise level within the signal and/or the fieldstrength of the frequency modulated RF-signal. Further, e.g. EP 0 955 732 A1 discloses to divide the stereo difference signal into several subbands and to perform the stereo to mono blending, i.e. the attenuation of the stereo difference signal, independently in each subband. Such a frequency selective stereo to mono blending improves the signal to noise ratio and the channel separation of a FM receiver, especially when low RF signal amplitudes are received. However, all these systems have in common that the reception conditions are the main factor for performing the denoising stereo to mono blending which might lead to an unwanted reduction of the channel separation in many cases.

Therefore, it is the object underlying the present invention to provide an improved method to denoise a stereo signal and an improved stereo signal noise reducer.

The method to denoise a stereo signal, comprising a stereo sum signal and a stereo difference signal, wherein a stereo to mono blending on basis of an attenuation of the stereo difference signal with at least one first attenuation factor is performed, according to the present invention is characterized by weighting the at least one first attenuation factor under consideration of the difference signal amplitude to determine a second attenuation factor to attenuate the stereo difference signal.

The stereo signal noise reducer which performs a stereo to mono blending on basis of an attenuation of the stereo difference signal with at least one first attenuation factor according to the present invention comprises a weighting unit which determines a second attenuation factor to attenuate the stereo difference signal by weighting the at least one first attenuation factor under consideration of the difference signal amplitude.

Preferred embodiments of the method to denoise a stereo signal and the stereo noise reducer according to the present invention which are defined in independent claims 1 and 12, respectively, are respectively defined in the following subclaims. A computer program product according to the present invention is defined in claim 11.

Therewith, according to the present invention, the difference signal amplitude is used to weight the "conventionally" determined (first) attenuation factor to determine a (second) attenuation factor to actually attenuate the difference signal, i.e. determine the strength of the stereo to mono blending or of the left/right channel separation. Therefore, distortions in the spatial perception of audio signals with low difference signal amplitude can be avoided.

The method to denoise a stereo signal comprising a stereo sum signal and a stereo difference signal according to the present invention can be combined with a noise reducer according to DE 44 00 865 C2 which performs a simple sliding stereo to mono blending or with a noise reducer as disclosed in EP 0 955 732 A1 which performs a frequency selective sliding stereo to mono blending. The content of EP 0 955 732 A1 which is filed by the applicant of this application is herewith included into this specification.

A particular preferred combination is characterized by a frequency selective stereo to mono blending based on the masking effect of the human auditory system as it is disclosed in the European Patent Application No. 00 124 466.4 of the applicant which content is herewith included into this specification. However, the present invention is not limited to such a combination of its preferred embodiments as defined in the appended claims with the teaching disclosed in European Patent Application No. 00 124 466.4, in particular in the claims of that application, but—as stated above—might be used in all different systems which perform a noise reduction based on a sliding stereo to mono blending.

The method according to the present invention preferably performs a frequency selective stereo to mono blending on basis of an attenuation of subbands of the stereo difference signal which attenuation is respectively determined under consideration of the subband signal, i.e at least the respective difference signal subband, but depending on the noise reducer also the corresponding sum signal subband and/or noise signal subband.

Also preferably, according to the present invention the weighting of the at least one "conventional" first attenuation factor is determined on basis of the ratio difference signal power estimation to noise power estimation. Therewith, distortions in the audio signal can be avoided in case the difference signal amplitude is only slightly higher than the noise power. In particular the distortions in monoaural program parts, for example news, are reduced by this operation.

In this case the weighting of the at least one "conventional" first attenuation factor is preferably determined on basis of a first characteristic weighting of the ratio difference signal power estimation to noise power estimation.

Also preferably, according to the present invention the weighting of the at least one "conventional" first attenuation factor is determined on basis of the ratio sum signal power estimation to difference signal power estimation. In case the sum signal has a much higher amplitude than the difference signal, the audio signal is almost a monoaural signal. Therefore, this operation can avoid distortions in the spatial effects of audio signals with low stereo information.

In this case the weighting of the at least one "conventional" first attenuation factor is preferably determined on basis of a second characteristic weighting of the ratio sum signal power estimation to difference signal power estimation.

The first and/or second characteristic might depend on the reception field-strength and/or the noise power estimation and/or a multipath indication. Of course, also the background noise surrounding the receiver, e.g. in a car, might be considered, as e.g. disclosed in the European Patent Application No. 00 124 466.4.

Also preferably, according to the present invention the noise power estimation is respectively subtracted from the sum signal power estimation and the difference signal power estimation to increase the reliability of the respective signal power estimation. In particular, the moving average values of the noise power estimation, the sum signal power estimation and the difference signal power estimation are used. The noise power estimation might be respectively weighted before respectively being subtracted from the sum signal power estimation and the difference signal power estimation in order to take the noise power spectral density of the FM demodulated multiplex signal into account. In particular, it can be considered that the noise power in the sum signal is lower than the noise power in the difference signal by using different weighting factors.

Also preferably, according to the present invention the noise power estimation is determined by filtering the noise with a linear filter or non-linear filter with different attack and/or hold and/or decay time constants. In this case, the time constant(s) might depend on the noise power estimation and/or the communication channel.

To minimise audible distortions in the audio signal, the attenuation of the difference signal might be increased by a respective (variable) factor which is added to a respective attenuation factor. This factor might also depend on the reception fieldstrength and/or the noise power estimation and/or other parameters like the background noise surrounding the receiver. In case this factor is negative an additional limiter is required to avoid negative attenuation factors.

Further, the respective sum and difference signals used to determine the respective attenuation factor are limited to a value $\geq/>0$ after the respectively weighted noise is subtracted to avoid a signal power estimation of lower than zero.

Still further, the "conventionally" determined first attenuation factor, i.e. the attenuation factor which is not weighted under consideration of the difference signal amplitude, might be limited to a specific value in the range between 0 and 1 before it is weighted with the difference signal amplitude dependent factor determined according to the present invention to avoid an amplification of the difference signal. This specific factor might be dependent on the reception fieldstrength and/or the noise power estimation and/or other parameters like the background noise surrounding the receiver.

A computer program product according to the present invention comprises computer program means adapted to perform the above discussed method steps when it is executed on a computer, digital signal processor, or the like.

Said weighting unit of said noise reducer according to the present invention preferably comprises at least one first division unit to determine a ratio of a difference signal power estimation to a noise power estimation. In this case said weighting unit might additionally comprise at least one first filter and/or non-linear operation to weight the ratio difference signal power estimation to noise power estimation with a first predetermined characteristic.

Said weighting unit of said noise reducer according to the present invention preferably alternatively or additionally comprises at least one second division unit to determine a ratio of a sum signal power estimation to a difference signal power estimation. In this case said weighting unit might additionally comprise at least one a second filter and/or non-linear operation to weight the ratio sum signal power estimation to difference signal power estimation with a second predetermined characteristic.

Said noise reducer according to the present invention preferably comprises at least one first multiplier to weight the noise power estimation with a first weighting factor, at least one first subtracter to subtract the weighted noise power estimation from the sum signal power estimation, at least one second multiplier to weight the noise power estimation with a second weighting factor, and at least one second subtracter to subtract the weighted noise power estimation from the signal power estimation.

Alternatively or additionally said noise reducer according to the present invention preferably comprises at least one first non-linear filter with different attack and/or hold and/or decay time constants to determine the noise power estimation by filtering the noise. Depending on the communication channel this non-linear filter can be replaced by a linear filter.

Further alternatively or additionally said noise reducer according to the present invention preferably comprises a first analysis filter bank to divide the stereo difference signal into subbands to perform the stereo to mono blending frequency selective on basis of an attenuation of subbands of the stereo difference signal, a synthesis filter bank to rebuild an attenuated stereo difference signal on basis of all possibly attenuated subbands of the stereo difference signal, a second analysis filter bank to divide the stereo sum signal into subbands corresponding to the difference signal subbands, and a third analysis filter bank to divide the noise into subbands corresponding to the difference signal subbands, wherein a respective weighting factor for every difference signal subband is determined on basis of the corresponding contents of the difference signal subband itself, the corresponding sum signal subband, and the corresponding noise subband. The third analysis filter bank for the bandsplitting of the noise signal can be omitted; in this case the same noise indication signal is used for all subband signals. Then, the calculation power requirements of the denoising system are reduced, but the noise reduction performance is also reduced.

Therewith, in case a frequency selective noise reducer according to the present invention is realized, all the above components but the filter banks are needed for every subband, since an individual attenuation factor is determined for every subband.

Figure 1:
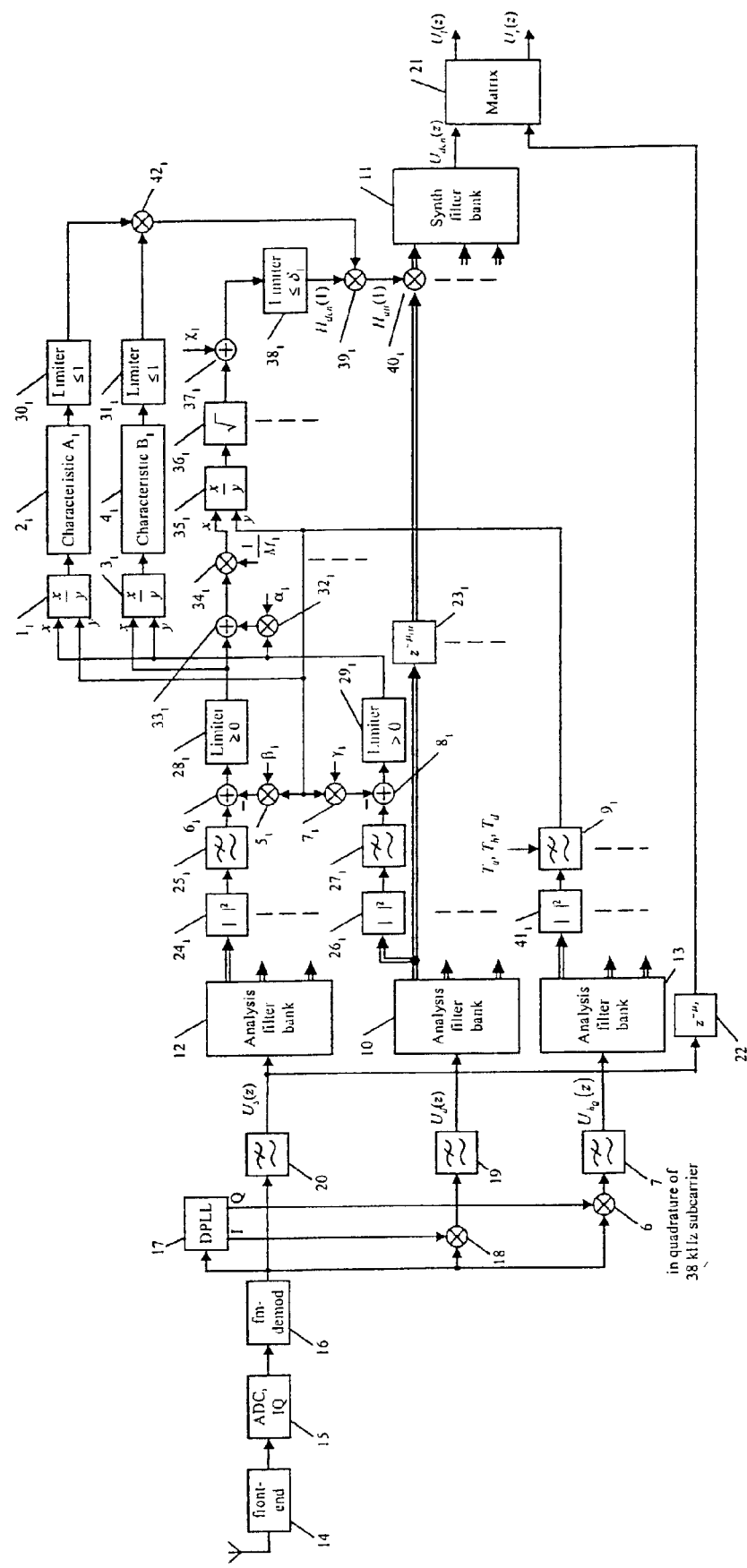

Further objects, advantages and features of the present invention will be better understood from the following detailed description of a preferred embodiment thereof taken in conjunction with the accompanying drawings, wherein:

FIG. 1 shows a digital receiver for FM broadcast with a frequency selective and preferably psychoacoustically motivated stereo to mono blending according to the present invention; and FIG. 2 shows the spectrum of a stereo multiplex signal.

FIG. 1 depicts a digital receiver for FM broadcast according to the present invention, which realizes a the psychoacoustically motivated stereo to mono blending under consideration of the amplitude of the difference signal, i.e. the respective subband thereof. As mentioned above, this combination of the present invention with the teaching disclosed in the European Patent Application No. 00 124 466.4 is preferred, but the present invention is not limited thereto.

A received stereo broadcast signal passes through a front-end stage 14, an analogue to digital converter with IQ generator 15 to be supplied to a FM-demodulator 16 which outputs the stereo multiplex signal which spectrum is shown in FIG. 2. This stereo multiplex signal is supplied to a third lowpass filter 20 which outputs the stereo sum signal $U_s(z)$ via a first delay element 22 to a matrix circuit 21 which also receives the filtered, i.e. frequency selective attenuated, stereo difference signal $U_{den}(z)$ to output the signal for the left channel $U_l(z)$ and the output signal for the right channel $U_r(z)$.

The stereo multiplex signal output from the FM-demodulator 16 is further input to the digital phase locked loop circuit (DPLL) 17 which outputs an I-signal which is in phase to the 38 kHz subcarrier to a second mixer 18 which additionally receives the stereo multiplex signal to demodulate the amplitude modulated stereo difference signal $U_d(z)$ which is gained by filtering the output signal of the second mixer 18 with a second lowpass filter 19. The DPLL 17 further outputs a Q-signal which is in quadrature to the 38 kHz subcarrier to a first mixer 6 which also additionally receives the stereo multiplex signal to derive the in quadrature component of the stereo difference signal $U_{h_Q}(z)$ by lowpass filtering the output signal of the first mixer 6 with a first lowpass filter 7. The in quadrature component of the stereo difference signal $U_{h_Q}(z)$ represents the noise included in the stereo signal.

The stereo sum signal $U_s(z)$, the stereo difference signal $U_d(z)$ and the in quadrature component of the difference signal $U_{h_Q}(z)$ are subband filtered for the calculation of the signal and the noise power. The subband filtering is preferably performed with corresponding filters with a bandwidth identical to the critical bandwidth of the human auditory system as described in European Patent Application No. 00 124 466.4. Of course, also other implementations for the filter banks are possible. As described before, the subband filtering of the in quadrature component of the difference signal can be avoided. In this case some performance loss occurs.

For the sake of simplicity only the circuitry for one subband is shown in FIG. 1. Since the first subband is shown all reference signs to circuit elements comprise the index 1, the attenuation factors are therefore marked with (1).

Each of the N output signals of the first analysis filter bank 10 which filters the stereo difference signal $U_d(z)$ is fed via a respective second delay element $23_1, \ldots, 23_N$ to a respective first multiplier $40_1, \ldots, 40_N$ which weights each of the delayed subbands of the stereo difference signal with a respective corresponding (second) attenuation factor $H_{att}(1), \ldots, H_{att}(N)$ before each of the weighted subband signals is supplied to a synthesis filter bank 11 which rebuilds the denoised, i.e. frequency selective weighted, stereo difference signal $U_{den}(z)$ which is supplied to the matrix circuit 21.

In the following the calculation of a respective (second) attenuation factor $H_{att}(1), \ldots, H_{att}(N)$ is described by way of example for the attenuation factor $H_{att}(1)$ which is used to filter the first of the N subbands with index 1. All other subbands $2 \ldots N$ need an equal circuitry which is not shown in FIG. 1.

The respective moving average signal and noise power of the audio subband signals gets calculated. The respective filter is preferably a respective linear filter or non-linear filter with variable attack $T_a$, hold $T_h$ and decay $T_d$ time constants and basically consists of a respective squaring unit followed by the respective filter.

The moving average noise power of the corresponding audio subband signal is obtained via a respective first moving average filter which comprises a first squaring unit $41_1$ followed by a first linear or non-linear filter $9_1$ by filtering a squared output signal of a third analysis filter bank 13 which splits the in quadrature component of the difference signal $U_{h_Q}(z)$ into subbands corresponding to the first filter bank 10, i.e. generates subbands corresponding to those generated by the first filter bank 10. Preferably all filter banks output complex baseband signals.

The moving average difference signal power of the corresponding audio subband signal is obtained with a respective second moving average filter which comprises a second squaring unit $26_1$ followed by a second linear filter $27_1$ by squaring and filtering the corresponding output signal of the first filter bank 10, i.e. the audio signal corresponding to the subband with index 1. The moving average sum signal power of the corresponding audio subband signal is obtained with a respective third moving average filter which comprises a third squaring unit $24_1$ followed by a third linear filter $25_1$ by squaring and filtering the corresponding output signal of the second filter bank 12 which divides the stereo sum signal $U_s(z)$ in the same manner as the first filter bank 10 divides the stereo difference signal $U_d(z)$. The squaring units are used to calculate the absolute of a complex baseband subband signal.

The moving average noise power gets weighted with a first weighting factor $\beta_1$ by a first multiplier $5_1$ and gets subtracted by a first subtracter $6_1$ from the moving average sum signal power and the moving average noise power gets weighted with a second weighting factor $\gamma_1$ by a second multiplier $7_1$ and gets subtracted by a second subtracter $8_1$ from the moving average difference signal power.

The output signal of the first subtracter $6_1$ gets limited to $\geq 0$ by a first limiter $28_1$ and the output signal of the second subtracter $8_1$ gets limited to $>0$ by a second limiter $29_1$ to avoid a signal power estimation lower than zero before the output signal of the second limiter $29_1$ gets weighted by a fourth multiplier $32_1$ with a third weighting factor $\alpha_1$ and added by a first adder $33_1$ to the output signal of the first limiter $28_1$ to obtain a moving average signal power. The weighting with the third weighting factor $\alpha_1$ is performed to avoid errors in the calculation of the moving average signal power of the audio subband signal, especially at low SNR, the third weighting factor $\alpha$ lies in the range $0 \leq \alpha \leq 1$, here $0 \leq \alpha_1 \leq 1$, which also might depend on the reception situation as explained above.

To take the absolute threshold of masking of a respective subband into consideration, the moving average signal power output by the first adder $33_1$ is divided by a variable $M_1$ by way of a multiplication with $1/M_1$ by a fourth multiplier $34_1$. As mentioned above, this variable $M_n$ may also respectively depend on the reception situation and/or the signal and noise power of the difference signal as explained above.

The respective weighted moving average signal power of the audio signal is divided by the respective corresponding moving average noise power in a respective third division unit $35_1$, undergoes a square root operation $36_1$ before a correcting factor $\chi_1$ is added by a second adder $37_1$ and the resulting signal is limited with a third limiter $38_1$ to $0 \leq \delta_1 \leq 1$ with $\delta_1$ depending on the reception situation, e.g. the field-strength, to calculate the "conventional" (first) attenuation factor $H_{den}$ of the corresponding subband difference signal, here $H_{den}$ (1). The correcting factor $\chi_1$ which increases the attenuation of the difference signal is used to minimize the audible noise distortions in the audio signal. In a good reception situation the correcting factor $\chi_1$ can also be used to decrease or limit the attenuation of the difference signal in order to avoid denoising artefacts.

As mentioned above, the "conventional" (first) attenuation factor $H_{den}$ itself is limited to values between 0 and 1. In case of very bad reception conditions a limitation of the control signal to values <1 reduces the effect of the modulation of the stereo effect. So the limitation should be depending on the reception situation and/or the signal and noise power of the difference signal as explained above.

To take the amplitude of the subband difference signal into account, i.e. to avoid distortions in the spatial perception of audio signals with low difference signal amplitude, the "conventional" (first) attenuation factor $H_{den}$ (1) gets multiplied, i.e. weighted, with a weighting signal by a fifth multiplier $39_1$ to obtain the (second) attenuation factor $H_{att}$(1) according to the present invention. In respect to the attenuation factor described in the above referenced European Patent Application No. 00 124 466.4, the here described "conventional" (first) attenuation factor is more reliable, since the moving average noise estimation is subtracted from the moving average signal estimation.

The weighting signal to determine the (second) attenuation factor $H_{att}$ from the "conventional" (first) attenuation factor $H_{den}$ is obtained by filtering the signal obtained from the first division unit $1_1$ which divides the output signal of the second limiter $29_1$ by that of the first linear filter $9_1$, i.e. which builds the ratio difference signal power estimation to noise power estimation, with a first characteristic $A_1$ in a first filter unit $2_1$ and limiting the resulting signal with a fourth limiter $30_1$ to a value $\leq 1$, the characteristic $A_1$ might also contain non-linear operations with or without filter functionality, filtering the signal obtained from the second division unit $3_1$ which divides the output signal of the first limiter $28_1$ by that of the second limiter $29_1$, i.e. which builds the ratio sum signal power estimation to difference signal power estimation, with a second characteristic $B_1$ in a second filter unit $4_1$ and limiting the resulting signal with a fifth limiter $31_1$ to a value $\leq 1$, the characteristic $B_1$ might also contain non-linear operations with or without filter functionality, and multiplying the output signals of the fourth limiter $30_1$ with that of the fifth limiter 31 by a sixth multiplier $42_1$.

FIG. 1 shows the first delay element 22 with a delay $\mu_s$ to equalize the group delay of the whole filtering, i.e. from the analysis banks to the synthesis filter bank, so that the sum signal $U_s(z)$ and the denoised difference signal $U_{den}(z)$ correspond in time, and the second delay element $23_1$ with a delay $\mu_{ctr}$ to equalize the group delay of the filters needed for the calculation of the attenuation factor, i.e. from after the analysis banks to before the synthesis filter bank, so that the delayed difference signal corresponds to the calculated attenuation factor.

The subband bandwidth and realization of the filter banks is preferably chosen as disclosed in the European Patent Application No. 00 124 466.4, i.e. as a combination of a complementary filter bank disclosed in N. J. Fliege, "Multirate Digital Signal Processing", Whiley & Sons, 1995 with interpolated DFT filter banks, as shown in R. E. Crochiere, L. R. Rabiner "Multirate Digital Signal Processing", Prentice-Hall, 1983.

As mentioned in the European Patent Application No. 00 124 466.4, of course other filter banks fulfilling the described requirements might be used.

The invention claimed is:

1. A method to denoise a stereo signal including a stereo sum signal and a stereo difference signal, wherein a stereo to mono blending on basis of an attenuation of the stereo difference signal with at least one first attenuation factor is performed, comprising:

weighting the at least one first attenuation factor based on a difference signal amplitude to determine a second attenuation factor to attenuate the stereo difference signal, the weighting of the at least one first attenuation factor determined on a basis of a ratio of a difference signal power estimation to a noise power estimation.

2. The method according to claim 1, wherein the stereo to mono blending is performed frequency selective on basis of an attenuation of subbands of the stereo difference signal which is determined based on a subband signal.

3. The method according to claim 1, wherein the weighting of the at least one first attenuation factor is determined on basis of a first characteristic weighting of the ratio difference signal power estimation to noise power estimation.

4. The method according to claim 3, wherein the first and/or second characteristic depend on a reception field-strength or the noise power estimation or a multipath indication.

5. The method according to claim 1, wherein the noise power estimation is respectively weighted and subtracted from a sum signal power estimation and the difference signal power estimation to increase the reliability of each respective signal power estimation.

6. The method according to claim 1, wherein the noise power estimation is determined by filtering noise with a linear filter or a non-linear filter with different attack or hold or and/or decay time constants.

7. The method according to claim 6, wherein the time constant(s) depend on the noise power estimation or the channel.

8. A computer readable medium including processor executable instructions, wherein the instructions, when executed by a processor, cause the computer to perform the method as defined in claim 1.

9. A method to denoise a stereo signal including a stereo sum signal and a stereo difference signal, wherein a stereo to mono blending on basis of an attenuation of a stereo difference signal with at least one first attenuation factor is performed, comprising:

weighting the at least one first attenuation factor based on a difference signal amplitude to determine a second attenuation factor to attenuate the stereo difference signal, the weighting of the at least one first attenuation factor is determined on basis of a ratio of a sum signal power estimation to a difference signal power estimation.

10. The method according to claim 9, wherein the weighting of the at least one first attenuation factor is determined on basis of a second characteristic weighting of the ratio sum signal power estimation to difference signal power estimation.

11. A stereo signal noise reducer which performs a stereo to mono blending on basis of an attenuation of a stereo difference signal with at least one first attenuation factor, comprising:
  a weighting unit configured to determine a second attenuation factor to attenuate the stereo difference signal by weighting the at least one first attenuation factor based on a difference signal amplitudes, said weighting unit including at least one first division unit configured to determine a ratio of a difference signal power estimation to a noise power estimation.

12. The noise reducer according to claim 11, wherein said weighting unit comprises at least one first filter or a non-linear operation configured to weight the ratio of the difference signal power estimation to the noise power estimation with a first predetermined characteristic.

13. The noise reducer according to claim 11, further comprising:
  at least one first multiplier configured to weight the noise power estimation with a first weighting factor,
  at least one first subtracter configured to subtract a weighted noise power estimation from a sum signal power estimation,
  at least one second multiplier configured to the weight the noise power estimation with a second weighting factor, and
  at least one second subtracter configured to subtract the weighted noise power estimation from the difference signal power estimation.

14. The noise reducer according to claim 11, further comprising:
  at least one first linear filter or non-linear filter with different attack or hold or decay time constants configured to determine the noise power estimation by filtering noise.

15. The noise reducer according to claim 11, further comprising:
  a first analysis filter bank configured to divide the stereo difference signal into subbands to perform a stereo to mono blending frequency selection on a basis of an attenuation of subbands of the stereo difference signal,
  a synthesis filter bank configured to rebuild an attenuated stereo difference signal on a basis of all possibly attenuated subbands of the stereo difference signal,
  a second analysis filter bank configured to divide the stereo sum signal into subbands corresponding to difference signal subbands, and
  wherein a respective weighting factor for every difference signal subband is determined on a basis of corresponding contents of the difference signal subband itself, a corresponding sum signal subband and a noise signal.

16. The noise reducer according to claim 15, further comprising:
  a third analysis filter bank configured to divide the noise signal into subbands corresponding to the difference signal subbands,
  wherein a respective weighting factor for every difference signal subband is determined on a basis of the corresponding contents of the difference signal subband itself, the corresponding sum signal subband, and a corresponding noise subband.

17. A stereo signal noise reducer which performs a stereo to mono blending on basis of an attenuation of a stereo difference signal with at least one first attenuation factor, comprising:
  a weighting unit configured to determine a second attenuation factor to attenuate the stereo difference signal by weighting the at least one first attenuation factor based on a difference signal amplitude, said weighting unit including at least one second division unit configured to determine a ratio of a sum signal power estimation to a difference signal power estimation.

18. The noise reducer according to claim 17, wherein said weighting unit comprises at least one a second filter or a non-linear operation configured to weight the ratio of the sum signal power estimation to the difference signal power estimation with a second predetermined characteristic.

19. A method to denoise a stereo signal including a stereo sum signal and a stereo difference signal, comprising:
  performing a stereo to mono blending on a basis of an attenuation of the stereo difference signal with at least one first attenuation factor; and
  weighting the at least one first attenuation factor based on a difference signal amplitude to determine a second attenuation factor to attenuate the stereo difference signal,
  wherein the weighting of the at least one first attenuation factor is determined on a basis of a ratio of a function of said stereo difference signal and a function of a noise signal.

20. A method to denoise a stereo signal including a stereo sum signal and a stereo difference signal, comprising:
  performing a stereo to mono blending on basis of an attenuation of the stereo difference signal with at least one first attenuation factor; and
  weighting the at least one first attenuation factor based on a difference signal amplitude to determine a second attenuation factor to attenuate the stereo difference signal,
  wherein the weighting of the at least one first attenuation factor is determined on a basis of a ratio of a function of said stereo sum signal and a function of said stereo difference signal.

21. A stereo signal noise reducer which performs a stereo to mono blending on basis of an attenuation of a stereo difference signal with at least one first attenuation factor comprising:
  a weighting unit configured to determine a second attenuation factor to attenuate the stereo difference signal by weighting the at least one first attenuation factor based on an amplitude of the stereo difference signal; and
  at least one division unit configured to determine a ratio of a function of the stereo difference signal and a function of a noise signal.

22. A stereo signal noise reducer which performs a stereo to mono blending on basis of an attenuation of a stereo difference signal with at least one first attenuation factor, comprising:
  a weighting unit configured to determine a second attenuation factor to attenuate the stereo difference signal by weighting the at least one first attenuation factor based on an amplitude of the stereo difference signal; and
  at least one division unit configured to determine a ratio of a function of a stereo sum signal and said stereo difference signal, said stereo sum signal corresponding to said stereo difference signal.

* * * * *